Nov. 8, 1949     T. T. SHORT     2,487,604
VIBRATORY CONVERTER SWITCH
Filed Sept. 21, 1945
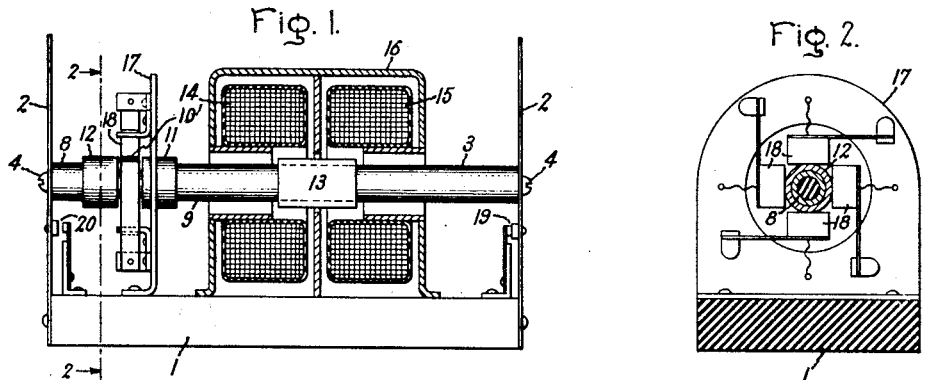
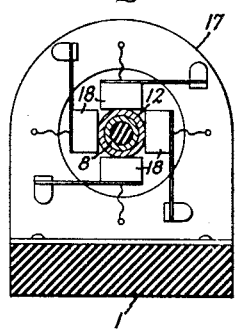
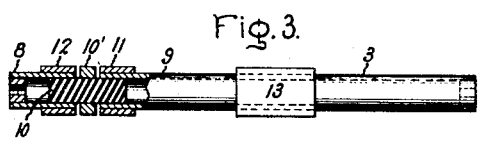
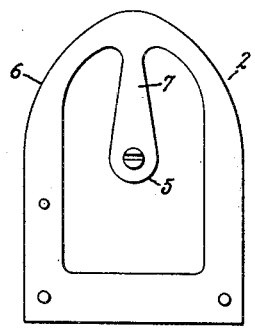
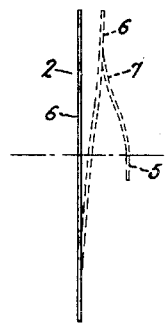
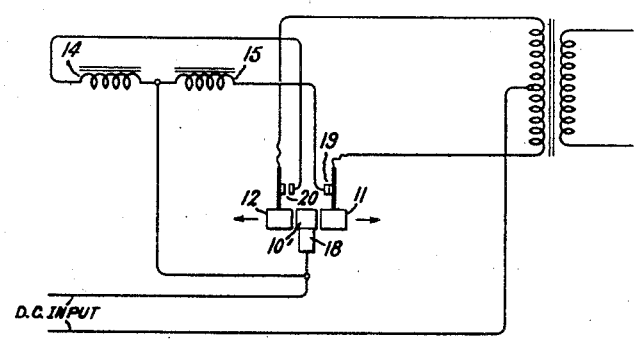
Inventor:
Thomas T. Short,
by Ernest C. Britton
His Attorney.

Patented Nov. 8, 1949

2,487,604

UNITED STATES PATENT OFFICE 2,487,604

VIBRATORY CONVERTER SWITCH

Thomas T. Short, Fort Wayne, Ind., assignor to General Electric Company, a corporation of New York Application September 21, 1945, Serial No. 617,860

1 Claim. (Cl. 200—90)

This invention relates to vibratory converters and more particularly to improvements in the current commutating or current switching element of vibratory converters.

By a vibratory converter is meant a device having a synchronously vibrating current commutating element which either rectifies alternating current into direct current or inverts direct current to alternating current.

In conventional vibratory converters there is a contact or contacts carried by a vibrating reed, or its equivalent, which contact or contacts make alternate abutting contact with adjacent fixed contacts. In other words, the relative motion of the cooperating contacts is perpendicular to their contact faces or contact surfaces. Such devices have the advantage that the natural period of vibration of the reed provides a simple, reliable, inexpensive and accurate means of fixing the frequency of the alternating current circuit, particularly when the converter is operating as an inverter. However, they have the disadvantage that proper operation depends upon extremely accurate contact adjustment and when the spacing of the contacts varies but very little from its optimum amount highly destructive contact arcing occurs and the life of the contact and hence of the device is very materially shortened. In fact, the contact adjustment is so critical that even the normal wear of the contacts after they have been set with initial optimum spacing will greatly accelerate the aging of the device.

Another form of converter is a so-called mechanical or synchronous commutator type converter in which the switching or commutating action is accomplished by means of a synchronously rotating commutator. Such a device does not have the contact difficulties that the vibratory converter has but it requires a relatively expensive driving motor and, in addition, when it is operating as an inverter it requires auxiliary means for keeping the motor speed constant.

In accordance with this invention I provide a converter which has the advantages of both the vibratory converter and the synchronous commutator type converter. Thus, I provide what may be called an oscillating or vibrating commutator in which there is continuous sliding engagement between the relatively movable parts of the switch or commutator although the motion of the movable element is a reciprocating motion and not a continuously rotating motion. In other words, the relative motion of the contacts is parallel to their contact faces or surfaces with the result that contact wear has no effect on the setting or current commutating action of the device. At the same time the oscillating member is mounted on springs so that the entire oscillating assembly has a natural period of vibration or oscillation corresponding to the desired frequency of the alternating-current circuit with which it is associated. These springs are preferably of the novel construction shown so as to provide improved operation.

A further advantage of this construction is that during the commutating interval or current reversal interval the relative transverse movement of the contacts will be a maximum, which is conducive to good switching action. Furthermore, at the points of reversal of direction of the oscillating element when the element is momentarily stationary the contact current will be the highest, and as the contact resistance is a minimum when the relative contact speed is a minimum optimum conductivity conditions exist during the maximum current intervals.

Still another advantage is that vibratory converters of my construction may readily be ganged mechanically. This is not practical with conventional vibratory converters because of the highly critical contact settings of the individual converters.

An object of the invention is to provide a new and improved vibratory converter.

A further object of the invention is to provide a vibratory converter having a novel oscillating commutator.

An additional object of the invention is to provide an improved current commutating means for vibratory converters.

The invention will be better understood from the following description taken in connection with the accompanying drawing and its scope will be pointed out in the appended claim.

In the drawing Fig. 1 is a side elevation, partly in section, of an embodiment of the invention, Fig. 2 is a section taken on line 2—2 of Fig. 1 showing the brush assembly, Fig. 3 is a detailed view of the oscillating armature or shuttle assembly, Fig. 4 is a front elevation view of one of the mounted springs for the armature assembly, Fig. 5 is an edge elevation view of one of the mounting springs, and Fig. 6 is a circuit diagram.

Referring now to the drawing and particularly to Fig. 1, the illustrated converter is shown as comprising a base member 1 made of any suitable, and preferably insulating, material. Attached to opposite sides of the base 1 are duplicate blade or leaf springs 2, the details of which are shown more clearly in Figs. 4 and 5. Mounted for translational oscillation by means of springs 2 is an armature assembly 3, the details of which are shown more clearly in Fig. 3. As shown, the opposite ends of the armature assembly 3 are attached by suitable means, such as screws 4, to the free ends 5 of the springs 2.

The springs 2 are so constructed that as they are deflected their free ends stay on the same straight line so that the motion of the armature is one of pure translation and does not have a transverse component. This can be seen most clearly from Fig. 5 in which the full line shows the undeflected position and the dashed line shows the spring under deflection, and it will be seen that as the outer frame portion 6 of the spring deflects and thus tends to lower the free end 5, the accompanying deflection of the spring finger 7 produces a compensatory raising of the free end 5 so that there is no transverse motion of the free end 5 when it moves between the two positions shown in Fig. 5.

The constant of the springs and the mass of the armature are so proportioned that the spring mounted armature assembly has a natural period of oscillation corresponding to a desired alternating-current frequency and, for example, it can be designed to make sixty complete cycles of oscillation every second.

The armature assembly preferably consists of two electrical conducting members 8 and 9 which are attached to and insulated from each other by an intermediate insulating member 10. The members 8 and 9 have contact rings 12 and 11, respectively, which together with a similar ring 10' on the insulating member 10 (which acts as an insulated ring between the contact rings) constitutes an oscillating commutator member. Electrical connections to the contacts 12 and 11 are made through the members 8 and 9 respectively and the mounting springs 2.

The armature assembly is driven by means of a driver armature 13 which is preferably a steel tube over the right-hand part 9 of the armature assembly. The latter and also the left-hand member 8 are preferably a hollow tube, preferably of aluminum or similar non-ferrous metal, for providing strength, lightness and electrical conductivity. Surrounding the driver armature 13 are a pair of coaxial driver coils 14 and 15 which are contained in a suitable housing 16. The magnetic centers of the driver coils 14 and 15 are preferably equally displaced on opposite sides of the magnetic center of the driver armature 13 when the latter is at rest or is in its mid-position or is in the mid-position of its range or amplitude of oscillation.

Surrounding the commutator elements is a brush assembly 17. Any number of brushes may be used and, as shown in Fig. 2, four brushes 18 are employed, they all being connected by pigtails to the main supporting frame which is preferably made of electrical conducting material. As shown in Fig. 1, the brushes are substantially as wide as the insulated segment 10' and they are so positioned that they are wholly in contact with the insulated segment when the armature is at rest or in the mid-position of its range of oscillation.

For the purpose of making the device self-starting separate sets of starting contacts 19 and 20 are provided, these consisting of movable contacts on the respective springs 2 and cooperating fixed contacts mounted on the base 1, the starting contacts 19 being normally closed and the starting contacts 20 being normally open; that is to say, contacts 19 are closed when the device is at rest and contacts 20 are open when the device is at rest.

The electrical connections of the converter are shown in Fig. 6 in which there is a transformer having a mid-tapped winding connected to one side of a direct-current circuit and having its terminals connected to the respective contact segments 11 and 12. The brush or brushes 18 are connected to the other side of the direct-current circuit. The driven coils 14 and 15 are shown connected in series between the stationary ones of the two sets of starting contacts and the common terminal of the driver coils is connected to the brush 18.

The operation of the illustrated embodiment of the invention is as follows: Assume, for example, that a source of unidirectional potential is connected across the direct-current circuit. This will complete a circuit from one side of the direct-current circuit through the driving coil 15, the normally closed starting contacts 19 and one-half of the mid-tapped transformer winding back to the other side of the direct-current circuit. In other words, the driving coil 15 is bridged across between the brush 18 and the contact segment 11. This draws the armature assembly to the right, as viewed in Fig. 1, thus causing engagement between the brush and the contact segment 12 whereby the driver coil 15 is short circuited. However, the inertia of the armature assembly causes it to continue movement to the right until the starting contacts 19 open and 20 close, thus energizing the driver coil 14 and applying a reversing impulse to the armature so that the armature reverses until the armature moves to the left far enough to slide the contact segment 12 out of engagement with the brush 18 and the contact segment 11 into engagement with the brush 18. When the latter contact is made the driver coil 14 is short circuited but a current impulse is passed through the other path of the mid-tapped transformer winding.

After the device has been started the starting contacts 19 and 20 may be short circuited by any suitable means (not shown) and the device will continue to oscillate at its natural frequency because the vibratory contact action will alternately short circuit the driving coils 14 and 15 in such a way that the driving force of the energized one will always tend to cause it to be short circuited.

The alternate current impulses in opposite directions through the two halves of the mid-tapped winding of the transformer induce an alternating voltage in its other winding.

It is of course not essential to this invention that a single-pole type commutator or reversing switch be employed and it will be obvious that the commutating elements can be connected for double-pole operation so as to reverse the current impulses in one of the transformer windings instead of alternately in halves of the transformer winding as these two connections are well known equivalents. However, the illustrated arrangement is preferred because the use of one brush provides less frictional damping of the oscillating armature and obviously the less frictional damping the less energy required to drive the oscillating member and consequently the efficiency of the device is improved.

As has been previously mentioned above, the brush drop during maximum current conditions is a minimum because the oscillating armature is momentarily stationary at the two ends of its travel and this absence of relative movement produces minimum brush drop and also at these positions there is maximum area of contact between the brush and the conducting commutator segments. Conversely, when the middle insulating segment of the oscillating commutator passes the brush the speed of the oscillating element will be a maximum, thus facilitating the current transfer between the segments 11 and 12.

While there have been shown and described particular embodiments of this invention, it will be obvious to those skilled in the art that various changes and modifications can be made therein without departing from the invention and, therefore, it is aimed in the appended claim to cover all such changes and modifications as fall within the true spirit and scope of the invention.

What I claim as new and desire to secure by Letters Patent of the United States is:

In a vibratory converter, a switch having a stationary brush assembly and a vibratory commutator assembly, a base member, a pair of blade springs for supporting said commutator assembly for substantially pure translatory motion with a natural period of oscillation, said springs each having a first part attached to said base member and extending outwardly therefrom beyond said commutator assembly and a second part extending inwardly from said first part and attached to said commutator assembly, the relative resiliency and length of said parts being such that the vibratory motion is substantially pure translation, said brush assembly being stationary and in continuous engagement with the commutator assembly through the full amplitude of said oscillation, means including both of said blade springs for making electrical connection to said commutator assembly, and means for driving the oscillating commutator assembly at its natural period of oscillation.

THOMAS T. SHORT.

REFERENCES CITED

The following references are of record in the file of this patent:

UNITED STATES PATENTS

| Number | Name | Date |
| --- | --- | --- |
| 1,305,013 | Sandell | May 27, 1919 |
| 1,447,917 | Wilson | Mar. 6, 1923 |
| 1,650,799 | Lee | Nov. 29, 1927 |
| 1,745,878 | Trumpler | Feb. 4, 1930 |
| 1,798,922 | Ytterberg | Mar. 31, 1931 |
| 1,877,480 | Osborne | Sept. 13, 1932 |
| 1,954,689 | Allen | Apr. 10, 1934 |
| 1,961,058 | Mace | May 29, 1934 |
| 2,000,136 | Huss | May 7, 1935 |
| 2,120,985 | Melhose | June 21, 1938 |
| 2,178,151 | Wagar | Oct. 31, 1939 |
| 2,253,267 | Dietrich | Aug. 19, 1941 |
| 2,268,882 | Lilja | Jan. 6, 1942 |
| 2,284,891 | Hartig | June 2, 1942 |
| 2,368,193 | Boynton | Jan. 30, 1945 |
| 2,427,898 | Burrows | Sept. 23, 1947 |
| 2,447,230 | Brown | Aug. 17, 1948 |